May 10, 1966 H. DOONG 3,251,053

ANALOG TO DIGITAL CONVERTER

Filed Nov. 2, 1962 2 Sheets-Sheet 1

Fig I

INVENTOR.
HENRY DOONG

BY

ATTORNEYS
[signature]
W. H. King

ANALOG TO DIGITAL CONVERTER

Filed Nov. 2, 1962

INVENTOR.
HENRY DOONG

BY

ATTORNEYS
J. D. O'Brien
W. H. King 3,251,053
Patented May 10, 1966

3,251,053

ANALOG TO DIGITAL CONVERTER

Henry Doong, Beltsville, Md., assignor to the United States of America as represented by the Administrator of the National Aeronautics and Space Administration Filed Nov. 2, 1962, Ser. No. 235,162
10 Claims. (Cl. 340—347)

Figure 1:
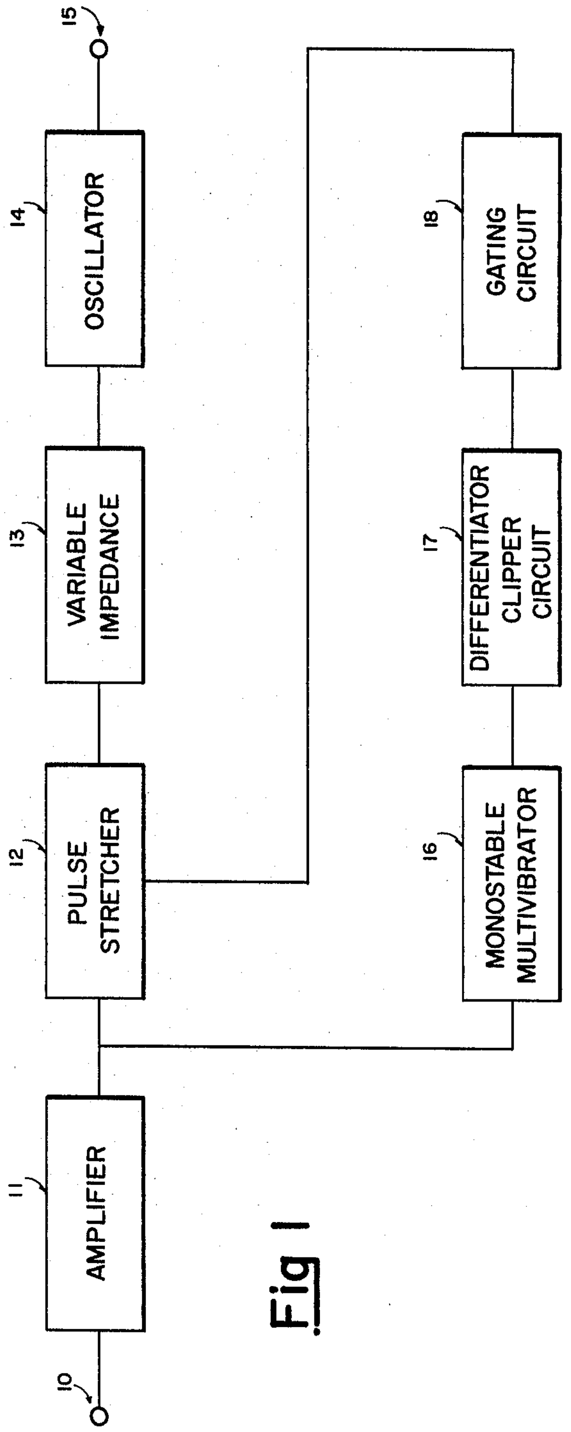

The invention described herein may be manufactured and used by or for the Government of the United States of America for governmental purposes without the payment of any royalties thereon or therefor.

The present invention relates generally to an improved analog to digital converter, and more particularly to an anlaog to digital converter which converts pulses, whose amplitudes represent an analog input, to frequencies which represent a digital output.

Prior analog to digital converters usually receive slow varying D.C. analog inputs and convert them into digital outputs. These converters work well for the purposes for which they were designed; however, they do not work satisfactorily in some applications where the analog input consists of short duration pulses the amplitudes of which represent the analog input. Also in these prior converters the usual techniques used to accomplish analog to digital conversions employ complex transistor circuits; including delay lines, crystal oscillators, etc. Designs of this variety of analog to digital converter usually involve 30 to 40 transistor stages and dissipate 550 to 750 milliwatt of power. They are expensive to fabricate, require large power supplies to operate, and take up too much space and weigh too much to be used in a satellite program.

The general purpose of the present invention is to provide an improved analog to digital converter which embraces all the advantages of similarly employed analog to digital converters, which will satisfactorily handle pulses having amplitudes representing an analog input, and which is more compact, less expensive, and more reliable, because of its simplicity, than previously used analog to digital converters. The present invention uses a new approach in solving this usually complex problem of analog to digital conversion with a few straightforward circuits.

In the present invention, the pulses whose amplitudes represent the analog input are first applied to an amplifier where they are amplified; each of the amplified pulses are then stretched to the same width. These stretched pulses are applied to a variable impedance which is connected to control the output frequency of an oscillator. The output frequencies of this oscillator are proportional to the amplitudes of the stretched pulses. These output frequencies are the digital output of the analog to digital converter.

The input analog pulses, which are applied to the input of the analog to digital converter, will usually have different widths. These different widths do not represent information, as all information conveyed by the input pulses is represented by their amplitudes. Since the amplitudes of these input pulses are used to control a variable impedance, which in turn controls the output frequencies of an oscillator, it is necessary that the amplitudes of the input pulses control the variable impedance for equal lengths of time. Otherwise, the linear relation between the amplitudes of the input pulses and the overall output frequency of the variable impedance controlled oscillator would be lost. Therefore, every input pulse must be stretched to the same width prior to its application to the variable impedance. The present application discloses simple, unique circuitry for performing this function.

It is an object of this invention to provide a simple, reliable analog to digital converter.

Another object of this invention is to provide an analog to digital converter which converts pulses the amplitudes of which represent an analog input, into frequencies which represent a digital output.

A further object of the invention is to provide a means for stretching all input pulses applied to an analog to digital converter to the same width, and at the same time, not altering the relative amplitudes of the input pulses.

Figure 2:
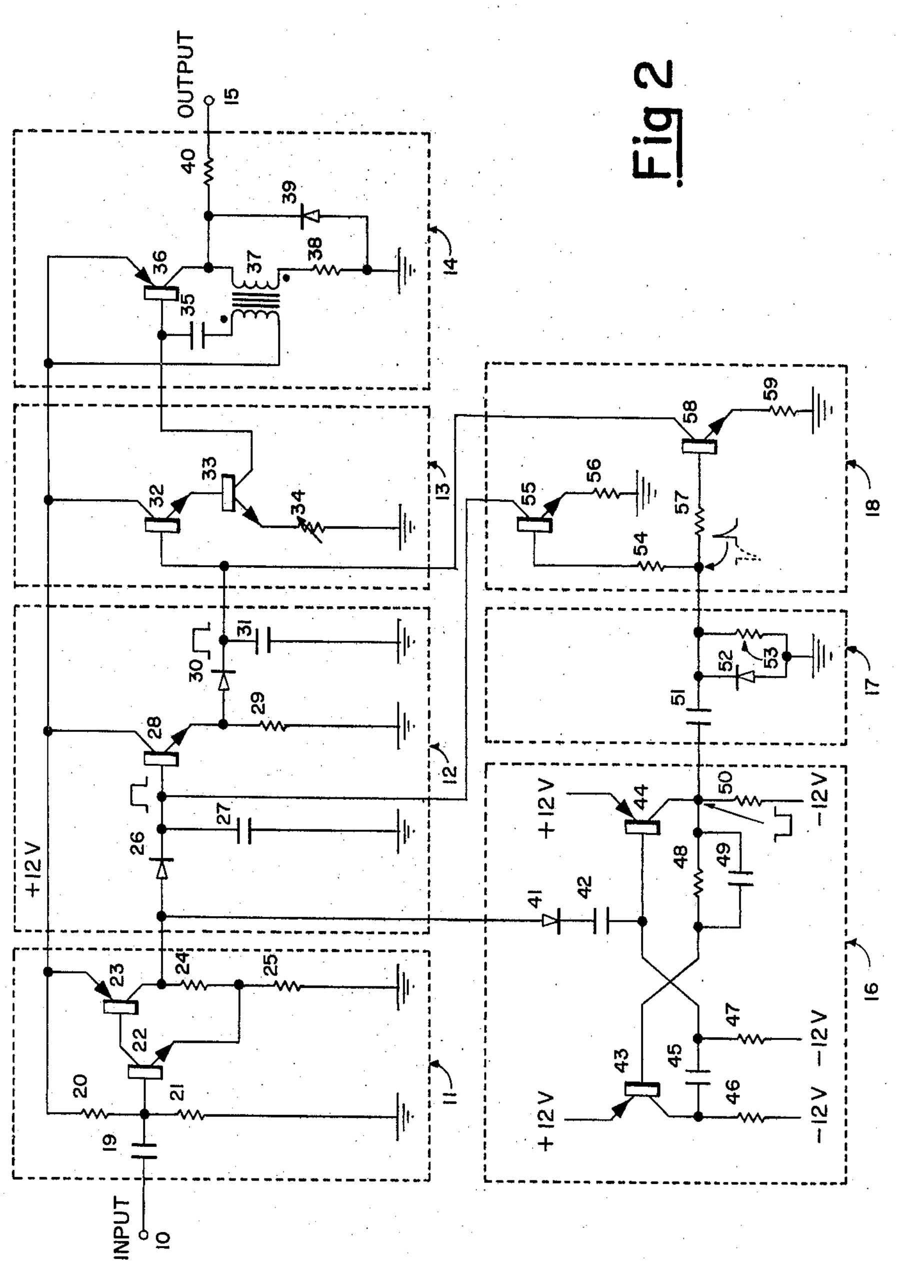

Other objects and a fuller understanding of this invention may be had by referring to the following description and claims, taken in conjunction with the accompanying drawing, in which:

FIG. 1 is a block diagram of an analog to digital converter incorporating the invention; and FIG. 2 is a schematic diagram of an analog to digital converter incorporating the invention.

Referring to FIG. 1, input analog pulses are applied to an amplifier 11 through an input terminal 10. Amplifier 11 is a linear amplifier within the amplitude range of the input pulses; therefore, the amplitudes of the pulses produced at the output of amplifier 11 are directly proportional to the amplitudes of the input pulses. These pulses produced at the outut of amplifier 11 are applied to a pulse stretcher 12 where, under the control of a monostable multivibrator 16, a differentiator clipper circuit 17 and a gating circuit 18, they are stretched to the same predetermined width.

When an amplified pulse is applied to the input of pulse stretcher 12 a voltage having a magnitude equal to the amplitude of this pulse is produced at the output of the pulse stretcher. The amplified pulse, which is applied to pulse stretcher 12, is also applied to monostable multivibrator 16. In response to this amplified pulse, monostable multivibrator 16 generates a pulse starting at the beginning of the amplified pulse and having a predetermined width. This generated pulse is applied to a differentiator clipper circuit 17 which produces a sharp gating pulse at the time of the following edge of the generated pulse. This gating pulse produced by differentiator clipper circuit 17 is applied to a gating circuit 18 to terminate the voltage being produced by pulse stretcher 12. Consequently, the amplified pulse applied to pulse stretcher 12 and monostable multivibrator 16 causes a pulse to be generated at the output of pulse stretcher 12 which has an amplitude proportional to the amplitude of the corresponding input pulse and which has a duration equal to the duration of the pulse generated by monostable multivibrator 16. This pulse generated by pulse stretcher 12 is applied to a variable impedance 13 which is connected to control the output frequency of an oscillator 14. The output frequency of oscillator 14, at output terminal 15, is proportional to the amplitude of the pulse generated by pulse stretcher 12. It should be noted at this point, that any oscillator whose frequency is controlled by voltage amplitudes can be substituted for variable impedance 13 and oscillator 14 without departing from this invention.

Since all the pulses generated by monostable multivibrator 16 will have equal widths, all the pulses generated by pulse stretcher 12 will have equal widths. Consequently, these pulses will control the frequency of oscillator 14 for equal lengths of time in accordance with their respective amplitudes. It follows that, because the amplitudes of the pulses generated by pulse stretcher 12 are proportional to the amplitudes of the input pulses, the output frequencies of oscillator 14 will be proportional to the amplitudes of the input pulses.

Referring now to FIG. 2, the dotted line rectangles correspond to the blocks in FIG. 1. The input pulses at terminal 10 are applied through a capacitor 19 to the base of an NPN transistor 22. Resistors 20 and 21 form a voltage divider which applies a bias voltage to the base of transistor 22. The collector of transistor 22 is connected to the base of a PNP transistor 23. The emitter-collector circuit of transistor 23 is connected in series with resistors 24 and 25 between a positive voltage power supply and ground. The emitter of transistor 22 is connected to the junction between resistors 24 and 25. The pulses which, due to the input pulses, are produced at the collector of transistor 23 are amplified input pulses. The gain of the amplifier circuit just described is linear within the amplitude range of the input pulses; therefore, the amplitudes of the pulses at the collector of transistor 23 are proportional to the amplitudes of the input pulses.

Each of the pulses at the collector of transistor 23 is applied to a diode 26 which is connected to allow only positive pulses to pass through it. Diode 26 also blocks the discharge of a capacitor 27 through resistor 24 and 25 to ground. When a pulse passes through diode 26 it charges capacitor 27. Capacitor 27 has a small capacitance so that the capacitor charges to the amplitude of the pulse applied to it in a very short time. Therefore, the voltage across capacitor 27, shortly after the pulse has been applied to it, is equal to the amplitude of the pulse.

Since capacitor 27 has a small capacitance, and since the circuitry which follows capacitor 27 will be a finite impedance to ground, capacitor 27 will begin to discharge immediately after the termination of the pulse applied to it. To remedy this defect, the voltage across capacitor 27 is used to charge a capacitor 31, which has a large capacitance, through an emitter-follower circuit consisting of an NPN transistor 28 and a resistor 29. The voltage across capacitor 27 is applied to the base of transistor 28 which causes a voltage to be produced at the emitter of transistor 28. This voltage is applied to capacitor 31 through a diode 30 which is connected to allow only positive voltages to pass through it. Diode 30 also prevents capacitor 31 from discharging through resistor 29. The magnitude of the voltage across capacitor 31 will remain more constant than the magnitude of the voltage across capacitor 27.

Control circuitry consisting of monostable multivibrator 16, differentiator clipper circuit 17 and gating circuit 18, will discharge both capacitor 27 and capacitor 31 a predetermined length of time after the pulse is applied through diode 26 to capacitor 27. This control circuitry will be described below. As can be understood by the above description, there is a pulse generated across capacitor 31. This pulse is initiated at the beginning of the pulse passed through diode 26, has an amplitude proportional to the amplitude of the pulse passed through diode 26, and has a width proportional to a predetermined value.

The pulse generated across capacitor 31 is then applied to the base of an NPN transistor 32 causing a positive pulse to be produced at the emitter of transistor 32. This pulse is applied to the base of an NPN transistor 33 which causes the impedance from collector to emitter of transistor 33 to change in accordance with the amplitude of this pulse. Therefore, the impedance from the collector of transistor 33 to ground is varied by the pulse applied to the base of transistor 32. A variable resistor 34 is connected between the emitter of transistor 33 and ground. This variable resistor 34 may be used to vary the range of impedance change from the collector of transistor 33 to ground.

The collector of transistor 33 is connected to oscillator 14 which consists essentially of a PNP transistor 36. The collector of transistor 33 is connected to the base of transistor 36. The emitter of transistor 36 is connected directly to a positive voltage power supply, and the collector of transistor 36 is connected to ground through the primary of a transformer 37 and a resistor 38. One side of the secondary of transformer 37 is connected to the positive voltage power supply and the other side is connected to the base of transistor 36 through a capacitor 35. A diode 39 is connected between the collector of transistor 36 and ground so that any overshoot transient pulses produced at the collecor of transistor 36 will be passed to ground. All positive pulses produced at the collector of transistor 36 will pass through a resistor 40 to output terminal 15.

The oscillator 14 produces positive pulses at output terminal 15 with the time between successive pulses being determined by the time constant of capacitor 35 and the impedance between the collector of transistor 33 and ground. Therefore, since the amplitude of the pulse at the base of transistor 32 controls the impedance between the collector of transistor and ground, the pulse at the base of transistor 32 controls the frequency at output terminal 15. By proper adjustment of variable resistor 34, different frequency spectrums at output terminal 15 can be selected.

The control circuitry that discharges capacitors 27 and 31 a predetermined length of time after the beginning of the amplified pulse which charges capacitor 27 will now be described. The amplified pulse at the collector of transistor 23, in addition to being applied to capacitor 27, is also applied through a diode 41, which is connected to pass only positive pulses, and through a capacitor 42 to the base of an NPN transistor 44. The emitter of transistor 44 is connected directly to a positive voltage power supply and the collector of transistor 44 is connected to a negative voltage power supply through a resistor 50. The collector of transistor 44 is also connected to the base of an NPN transistor 43 through a resistor 48 and a capacitor 49 connected in parallel. The emitter of transistor 43 is connected directly to the positive voltage power supply and the collector of transistor 43 is connected to the negative voltage power supply through a resistor 46. The collector of transistor 43 is also connected to the base of transistor 44 through a capacitor 45. The negative voltage power supply is connected to the base of transistor 44 through a resistor 47.

When the amplified pulse is applied through capacitor 42 to the base of transistor 44, a negative pulse is generated at the collector of transistor 44. The width of this generated pulse is determined by the time constant of capacitor 45 and resistor 47. Consequently, the width of this generated pulse can be predetermined by the selection of capacitor 45 and resistor 47. The circuitry just described, for generating a negative pulse when the amplified pulse that charges capacitor 27 is applied to it, is a well known monostable multivibrator, but is described here to give a more complete disclosure of this invention.

The negative pulse generated at the collector of transistor 44 is applied to a capacitor 51 which is connected to a resistor 53 to form a differentiator. The differentiator produces a sharp negative pulse across resistor 53 when the leading edge of the negative pulse, at the collector of transistor 44, is applied to capacitor 51; and it produces a sharp positive pulse across resistor 53 when the following edge of the negative pulse, at the collector of transistor 44, is applied to capacitor 51. A diode 52 is connected across resistor 53 to pass the negative pulse to ground, which means that only the positive pulse produced by the differentiator appears across resistor 53.

This positive pulse appearing across resistor 53 is applied through resistors 54 and 57 to the bases of NPN transistors 55 and 58 causing them to conduct and discharge capacitors 27 and 31 through resistors 56 and 59. The pulse produced across capacitor 31 will have the same width as the negative pulse generated at the collector of transistor 44, and will have a substantially constant amplitude throughout its width which amplitude will be proportional to the amplitude of the corresponding input pulse.

Obviously numerous modifications or variations of the present invention are possible in light of the above teachings. For example, different monostable multivibrators, gates and amplifiers can be used without departing from the invention. Also amplifier 11, instead of being a linear amplifier, could be a nonlinear amplifier. That is, its output could be some nonlinear function of its input. If this be true, the digital output would be a nonlinear function of the analog input. It is therefore to be understood that within the scope of the appended claims the invention may be practiced otherwise than specifically described herein.

What is claimed is:

1. In an analog to frequency converter for converting input pulses whose amplitudes represent an analog input into pulses the frequency of which represents a digital output comprising: means, connected to receive said input pulses, for generating a pulse, each time an input pulse is received, whose amplitude is proportional to the amplitude of the received pulse and whose width is a predetermined value which value is the same for all generated pulses; a variable impedance means connected to receive said generated pulses for producing an impedance which varies in accordance with the amplitudes of said generated pulses; and impedance controlled oscillator means connected to be controlled by said variable impedance means whereby the said oscillator means generates pulses, the frequencies of which are proportional to the amplitudes of said input pulses.

2. In an analog to frequency converter as in claim 1 wherein said pulse generating means includes capacitor means which charges to an amplitude proportional to the amplitude of a received input pulse and means for discharging said capacitor means at a time after receiving said input pulse equal to said predetermined value.

3. In an analog to frequency converter as in claim 2 wherein said capacitor discharging means comprises means, connected to receive said input pulse, for generating a pulse which is initiated at the beginning of said input pulse and which has a width equal to said predetermined value, means connected to receive the pulse generated by the last mentioned means for generating a gating pulse at the conclusion of this received pulse, and gating means connected to receive and gating pulse for discharging said capacitor means.

4. In an analog to frequency converter as in claim 1 wherein said pulse generating means comprises means for generating a voltage beginning at the beginning of the received pulse and having a magnitude proportional to the magnitude of the received pulse and means for terminating the said generated voltage at a time after the beginning of the received pulse equal to said predetermined value.

5. In an analog to frequency converter as in claim 4 wherein said voltage terminating means includes means for generating a pulse at a time after the beginning of the received pulse equal to said predetermined value.

6. In an analog to frequency converter as in claim 1 wherein said variable impedance means includes a variable resistance which can be varied independent of the pulses received by the variable impedance means whereby the range of impedance produced by the variable impedance means can be changed.

7. In an analog to frequency converter as in claim 1 wherein said pulse generating means includes storage means which stores a voltage amplitude proportional to the amplitude of a received input pulse and which produces a pulse having an amplitude equal to the stored amplitude and having a width equal to said predetermined value.

8. In an analog to frequency converter for converting input pulses whose amplitudes represent an analog input into pulses the frequency of which represents a digital output comprising: means, connected to receive said input pulses, for generating a pulse, each time an input pulse is received, whose amplitude is a function of the amplitude of the received pulse and whose width is a predetermined value which value is the same for all generated pulses; and voltage controlled oscillator means connected to be controlled by the amplitudes of the pulses generated by said pulse generating means whereby the oscillator means generates pulses, the frequencies of which are proportional to the amplitude of said input pulses.

9. In an analog to frequency converter as in claim 8 wherein said pulse generating means comprises means for generating a voltage beginning at the beginning of the received pulse and having a magnitude which is a function of the amplitude of the received pulse, and means for terminating the said generated voltage at a time after the beginning of the received pulse equal to said predetermined value.

10. In an analog to frequency converter for converting input pulses whose amplitudes represent an analog input into pulses the frequencies of which represent a digital output comprising: capacitor means having a small capacitance connected to receive said input pulse whereby the capacitor means charges to the amplitude of each pulse applied to it almost immediately upon recipt of the pulse; means connected to receive said input pulses for generating a pulse, each time an input pulse is applied to it, beginning at the beginning of the input pulse and ending a predetermined time later which predetermined time is the same for all generated pulses; means connected to receive said generated pulses for producing gating pulses at times corresponding to the ends of said generated pulses; gating means connected to receive said gating pulses for discharging said capacitor means; variable impedance means connected across said capacitor means for producing a change in impedance proportional to the voltage across said capacitor means; and oscillator means connected to said variable impedance means for generating pulses whose frequencies change proportional to the changes in impedance of said variable impedance means whereby the frequency changes of the pulses generated by said oscillator means are proportional to the amplitudes of said input pulses.

References Cited by the Examiner

UNITED STATES PATENTS

| | | | |
|---|---|---|---|
| 2,922,879 | 1/1960 | Vogt et al. | |
| 3,023,376 | 2/1962 | Smith | 328—150 X |
| 3,136,990 | 6/1964 | Howe | 340—347 |

DARYL W. COOK, *Acting Primary Examiner.*

ROBERT C. BAILEY, MALCOLM A. MORRISON, *Examiners.*

K. STEVENS, *Assistant Examiner.*